Figure 3:
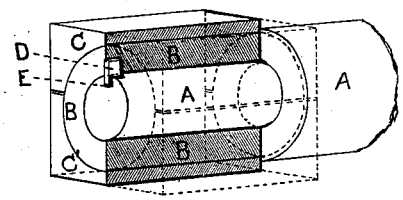

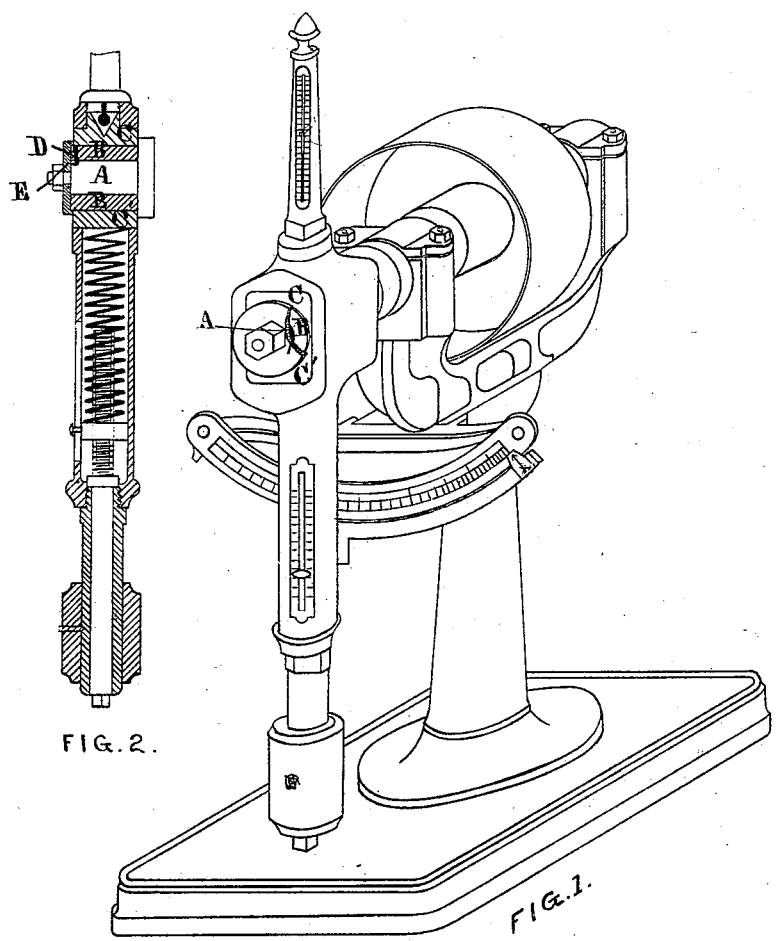

2 Sheets—Sheet 2.

R. H. THURSTON.
Machine for Testing Lubricants.

No. 230,158. Patented July 20, 1880.

WITNESSES.
A. Riesenberger
James E. Denton

INVENTOR.
R. H. Thurston
per T. T. Thurston
Attorney

UNITED STATES PATENT OFFICE.

ROBERT H. THURSTON, OF HOBOKEN, NEW JERSEY.

MACHINE FOR TESTING LUBRICANTS.

SPECIFICATION forming part of Letters Patent No. 230,158, dated July 20, 1880.

Application filed April 29, 1878.

*To all whom it may concern:*

Be it known that I, ROBERT H. THURSTON, of Hoboken, in the county of Hudson and State of New Jersey, have invented a new and useful Improvement in Machines for Testing Lubricants, which improvement is fully set forth in the following specification, reference being had to the accompanying drawings.

My invention has reference to that class of machines in which the lubricant to be tested is placed upon a revolving journal pressed by brasses.

The objects to be accomplished are, first, to make the testing-journal independent from its rotating shaft; second, to secure this independent journal to the shaft by means that shall permit it to be readily removed; third, to provide against any injury to the machine by any sudden or excessive adhesion between the testing-surfaces.

The value of these improvements has been fully proved by use.

As applied to a machine exhibited at the Centennial Exhibition at Philadelphia, 1876, they are illustrated in the accompanying drawings.

Figure 1 is a perspective view of the machine. Fig. 2 is a sectional view of my improvements, in combination with other parts of the machine. Fig. 3 is an enlarged view of that part of the shaft which bears the journal and a sectional view of the detachable journal and brasses.

A is the rotating shaft. B is the journal, clasped by brasses C C'. This journal is a hollow cylinder, whose internal diameter is such as to make it to fit closely that part of the shaft upon which it is placed, and whose external diameter is made to any desired dimension.

The principal advantages secured by making the journal independent from the shaft are, first, an injured journal can be replaced at a small expense; second, brasses of different sizes can be used with the same machine; third, a way of determining the amount of friction of different materials when bearing upon and rubbing over each other is afforded by simply making the brasses and detachable journal of those materials.

The journal is caused to revolve with the shaft by means of the projection D, which inserts from either one into the other. A convenient method is to let the projection D insert into a hole, E, at the end of the shaft, as shown in the figures. The journal can then be readily slipped off the shaft.

It occasionally happens that, for some reason, as the exhaustion of the lubricating properties of the lubricant, or some injury to the bearing-surfaces, the friction becomes excessive—so great as to overcome the resistance offered by the weighted pendulum—the latter would revolve with all the rapidity of the shaft.

The centrifugal force generated at the speed at which the machine is run is very great. It endangers the machine and all that may lie in or near the plane in which the pendulum revolves.

If, in seeking a remedy for such evils, a check is provided to prevent the pendulum and brasses from revolving, the bearing-surfaces would be ruined by grinding upon each other.

The best method of exempting the machine from such accidents is to make the projection D very small or weak, so that when the surfaces adhere to each other, and by excessive friction swing up the pendulum until it is checked at its extreme limit of motion, the edge of the hole E will shear off the projection D, and the shaft A will revolve within the cylinder B until the machine is stopped.

The bearings are saved from injury because under the conditions named they do not move upon each other. The machine and attendant and all surroundings are safe, because the shaft A is free to revolve within the journal B. The projection D, used as described and claimed, becomes, therefore, a safety-connection.

I claim as my invention—

1. The hollow removable testing-journal B, in combination with the rotating shaft A and the brasses C C', substantially as described.

2. The projection D and recess E of the testing-journal B and its shaft A, arranged for the purpose of readily connecting or disconnecting the one to or from the other and of serving as a safety-connection between them.

ROBERT H. THURSTON.

Witnesses:
F. T. THURSTON,
F. E. IDELL.